(12) United States Patent
Dableh

(10) Patent No.: US 6,805,774 B2
(45) Date of Patent: Oct. 19, 2004

(54) APPARATUS AND PROCESS FOR PURIFYING A LIQUID BY THERMOELECTRIC PELTIER MEANS

(76) Inventor: Youssef Hanna Dableh, 1505 Bathgate Road, Mississauga, Ontario (CA), L5M 4B2

( * ) Notice: Subject to any disclaimer, the term of this patent is extended or adjusted under 35 U.S.C. 154(b) by 0 days.

(21) Appl. No.: 10/110,127

(22) PCT Filed: Dec. 15, 2000

(86) PCT No.: PCT/CA00/01482

§ 371 (c)(1),
(2), (4) Date: Apr. 25, 2002

(87) PCT Pub. No.: WO01/45816

PCT Pub. Date: Jun. 28, 2001

(65) Prior Publication Data

US 2002/0179425 A1 Dec. 5, 2002

(30) Foreign Application Priority Data

Dec. 17, 1999 (CA) .............................. 2292383

(51) Int. Cl.⁷ .............................. B01D 1/00; B01D 5/00; C02F 1/04
(52) U.S. Cl. .............................. 203/1; 62/3.2; 62/238.5; 159/24.2; 159/DIG. 1; 202/176; 202/187; 203/22; 203/27; 203/87; 203/100; 203/DIG. 8; 203/DIG. 9; 203/DIG. 18
(58) Field of Search .................... 159/DIG. 1; 202/176, 202/185.3, 182; 62/3.2, 3.3, 3.7, 238.5, 3.4; 422/199

(56) References Cited

U.S. PATENT DOCUMENTS

| | | |
|---|---|---|
| 3,212,999 A | 10/1965 | Sommers, Jr. |
| 3,261,764 A | 7/1966 | Casey |
| 3,671,404 A | 6/1972 | Meckler |
| 4,792,059 A | 12/1988 | Kerner et al. |
| 5,431,021 A * | 7/1995 | Gwilliam et al. .............. 62/3.7 |
| 5,581,055 A | 12/1996 | Self et al. |
| 5,956,965 A * | 9/1999 | Watanabe et al. .............. 62/389 |
| 6,164,076 A * | 12/2000 | Chu et al. ...................... 62/3.7 |
| 6,375,805 B1 * | 4/2002 | Dableh .......................... 203/10 |

FOREIGN PATENT DOCUMENTS

| | | |
|---|---|---|
| DE | 3539086 | 5/1987 |
| DE | 4011877 | 10/1991 |
| EP | 0850675 | 7/1998 |
| JP | 1-184094 | 7/1989 |
| JP | 7-209841 | 8/1995 |
| WO | WO 95 34356 | 12/1995 |
| WO | WO 99 67004 | 12/1999 |

* cited by examiner

*Primary Examiner*—Virginia Manoharan
(74) *Attorney, Agent, or Firm*—Manelli Denison & Selter; Edward J. Stemberger

(57) ABSTRACT

A continuous process and apparatus is provided for treating an impure liquid to produce purified liquid. The process includes electrically activating a thermoelectric module (24) to provide a first module heated surface (26) and a module cooler surface (28); feeding the impure liquid to the first module heated surface (26) to produce vapor of the liquid; and transferring the vapor to the module cooler surface (28), to effect heat transfer to the module cooler surface (28). The process further includes (a) directing a first portion of the vapor adjacent to or onto the module cooler surface (28) to effect heat transfer to the module cooler surface to produce a first condensed liquid; (b) directing a second portion of the vapor to condenser means (18) having a second cooler surface (46) remote from the module cooler surface (28) to effect heat transfer to the second cooler surface (46) to produce a second condensed liquid; and (c) collecting the first and second condensed liquids.

29 Claims, 6 Drawing Sheets

APPARATUS AND PROCESS FOR PURIFYING A LIQUID BY THERMOELECTRIC PELTIER MEANS

FIELD OF THE INVENTION

This invention relates to a process of purifying a liquid, particularly water, using a thermoelectric module; and apparatus of use in said process.

BACKGROUND TO THE INVENTION

Thermoelectric modules are small, solid state, heat pumps that cool, heat and generate power. In function, they are similar to conventional refrigerators in that they move heat from one area to another and, thus, create a temperature differential.

A thermoelectric module is comprised of an array of semiconductor couples (P and N pellets) connected electrically in series and thermally in parallel, sandwiched between metallized ceramic substrates. In essence, if a thermoelectric module is connected to a DC power source, heat is absorbed at one end of the device to cool that end, while heat is rejected at the other end, where the temperature rises. This is known as the Peltier Effect. By reversing the current flow, the direction of the heat flow is reversed.

It is known that a thermoelectric element (TEE) or module may function as a heat pump that performs the same cooling function as Freon-based vapor compression or absorption refrigerators. The main difference between a TEE device and the conventional vapor-cycle device is that thermoelectric elements are totally solid state, while vapor-cycle devices include moving mechanical parts and require a working fluid. Also, unlike conventional vapor compressor systems, thermoelectric modules are, most generally, miniature devices. A typical module measures 2.5 cm×2.5 cm×4 mm, while the smallest sub-miniature modules may measure 3 mm×3 mm×2 mm. These small units are capable of reducing the temperature to well-below water-freezing temperatures.

Thermoelectric devices are very effective when system design criteria requires specific factors, such as high reliability, small size or capacity, low cost, low weight, intrinsic safety for hazardous electrical environments, and precise temperature control. Further, these devices are capable of refrigerating a solid or fluid object.

A bismuth telluride thermoelectric element consists of a quaternary alloy of bismuth, tellurium, selenium and antimony—doped and processed to yield oriented polycrystalline semiconductors with anisotropic thermoelectric properties. The bismuth telluride is primarily used as a semiconductor material, heavily doped to create either an excess (n-type) or a deficiency (p-type) of electrons. A plurality of these couples are connected in series electrically and in parallel thermally, and integrated into modules. The modules are packaged between metallized ceramic plates to afford optimum electrical insulation and thermal conduction with high mechanical compression strength. Typical modules contain from 3 to 127 thermocouples. Modules can also be mounted in parallel to increase the heat transfer effect or stacked in multistage cascades to achieve high differential temperatures.

These TEE devices became of practical importance only recently with the new developments of semiconductor thermocouple materials. The practical application of such modules required the development of semiconductors that are good conductors of electricity, but poor conductors of heat to provide the perfect balance for TEE performance. During operation, when an applied DC current flows through the couple, this causes heat to be transferred from one side of the TEE to the other; and, thus, creating a cold heat sink side and hot heat source side. If the current is reversed, the heat is moved in the opposite direction. A single-stage TEE can achieve temperature differences of up to 70° C., or can transfer heat at a rate of 125 W. To achieve greater temperature differences, i.e up to 131° C., a multistage, cascaded TEE may be utilized.

A typical application exposes the cold side of the TEE to the object or substance to be cooled and the hot side to a heat sink, which dissipates the heat to the environment. A heat exchanger with forced air or liquid may be required.

Water in bulk may be purified by a number of commercial methods, for example by reverse osmosis and by distillation processes.

Reverse osmosis (R.O.) technology relies on a membrane filtration system that is operated under high pressure. While this technology is one of the two leading technologies of water purification, it suffers from the following main disadvantages:

(a) the infrastructure of the system is complex because of the operating pressure, typically 8 atmospheres, required to cause the reverse osmosis process in the membrane;

(b) the membrane is an expensive component that needs to be replaced, frequently, depending on the salinity and the purity of the source water, generally, every 4 to 6 months. Also, there is a problem of membrane fouling, if the quality of the source water is not within certain bounds. The restriction on the water quality that is inputted into the system precludes many sources of water or would necessitate the utilization of pretreatment systems;

(c) the amount of purified water is very low when compared to the amount of water that has to be pumped into the system. Therefore, the cost of pumping and discharging the rejected water (capital cost to install the required facility and the energy cost to operate and maintain it) makes this system very costly;

(d) the quality of purified water obtained by the reverse osmosis process is inferior to that of distilled water, in the sense that it leaves small microorganisms and any impurities that are small enough to go through the membrane. Also, as the membrane ages, the water quality does not remain consistent;

(e) the system is feasible from a physical and economical point of view, for only large commercial installations. The system is not amenable for use in household units or even in small commercial units; and (f) energy, operating and maintenance costs are high for the R.O. system. The main disadvantages of distillation technologies, such as the multistage flashback evaporation systems, are:

(i) relatively large capital cost needed to assemble and install the system;

(ii) high energy costs to perform the evaporation, provide energy and equipment for the vacuum system and the condensation in, literally, three independent sub-systems;

(iii) significant corrosion problems that necessitate significant pretreatment of input water and complete replacement of plant equipment as frequently as every three to four years;

(iv) the system, generally, needs to be installed only near large power plants and large bodies of water; and (v) the disadvantages listed in item (e) and (f) hereinabove.

There is, therefore, a need to provide a means for producing a purified liquid, particularly water, in a safe, reliable, convenient, relatively cheap manner, having low energy requirements, and which either eliminates or reduces the aforesaid disadvantages.

Offenlegungsschrift DE 35 39 08 6A (Wagner Finish Tech Center GmbH) published May 7, 1987, describes apparatus for the purification of organic solvents containing paint or varnish by evaporation and condensation by use of a Peltier element which functions as both a heating and cooling element during the evaporation and condensation stages. An essential feature is the condensation of the solvent vapour solely on the cooling element.

It is known that in addition to the production of a temperature differential across the module between the 'hot' and 'cold' surfaces that heat may be beneficially "pumped" from the cold surface to the hot surface through the module. For example, latent heat of condensation of a vapour on the cold surface may be captured by the cooler element and pumped to the hot side. It is also known that the heat pumped by the cold side varies linearly with the cold side temperature.

However, in the apparatus and process described in OLS DE3539086A a balanced continuous evaporation and condensation equilibrium cannot be established by reason that the cold side of the module absorbs the latent heat which is then pumped to the hot element and, thus, very significant amounts of latent heat of the steam generated upon condensation must be removed from the vessel or the process 'shut down', intermittently, for periods of time to prevent the hot element overheating. This is an unsatisfactory situation when continuous process conditions are desired.

Japanese Kokai JP 07 209841, published Aug. 11, 1995 to Koicki Hayashi describes a small, low-cost and high-efficiency developer waste solution concentrator for use in small-scale retail stores. The concentrator is provided with a concentrating tank divided into an evaporation tank and a condensation tank, the upper parts of these tanks being in communication with each other; a heat-generating/heat-absorbing section which is made up of Peltier element parts wherein a heat-generating side is in contact with the evaporation tank and a heat-absorbing side with the condensation tank; a replenishing pump to control the volume of waste solution in the evaporation tank to a liquid volume within a certain constant range; and a cooling section to control the temperature of the heat-generating element side to a value within a certain constant range. The embodiments described therein effect condensation on the cooler element side of the module surface to provide purified liquid. To maintain the hot surface of the element at the desired temperature, a cooling fan means in conjunction with heat release fins are provided. However, such heat control means results in the need for additional physical items and reduced electrical and thermal energy efficiency.

There is, therefore, a need for a simple, safe, convenient and reliable process operable under continuous conditions of purifying a liquid, particularly water.

SUMMARY OF THE INVENTION

It is an object of the present invention to provide a method and apparatus for producing a purified liquid, particularly water under continuous conditions in a safe, convenient, reliable and relatively cheap manner by means of thermoelectric modules to generate hot and cold elements.

Accordingly, in one aspect the invention provides an improved continuous process for treating an impure liquid to produce purified liquid, said process comprising electrically activating a thermoelectric module to provide a first module heated surface and a module cooler surface; feeding said impure liquid to said first module heated surface to produce vapour of said liquid; and transferring said vapour to said module cooler module surface to effect heat transfer to said module cooler surface, the improvement comprising (a) directing a first portion of said vapour adjacent to or onto said module cooler surface to effect heat transfer to said module cooler surface to produce a first condensed liquid; (b) directing a second portion of said vapour to condenser means comprising a second cooler surface remote from said module cooler surface to effect heat transfer to said second cooler surface to produce a second condensed liquid; and (c) collecting said first and second condensed liquids; wherein said condensation means is such as to accept the balance of the latent heat contained in the vapour produced by said first module heated surface which cannot be pumped from said module cooler surface through the module to said first module heated surface in order to maintain the process under continuous vapour flow.

In this specification and claims the term "heatable or heated surface" means a surface of said thermoelectric module which is heated when said module receives an electric current or a surface in thermal communication with said module as to be heated thereby. The term "coolable or cooled surface" means a surface of said module which is cooled when said module receives an electric current or a surface in thermal communication with said module as to be cooled thereby.

The term "remote" in this specification describes the location of the condensation means coolable surface relative to the first module cooler surface as to allow of the beneficial practice and function of the invention as defined. Such location may be readily determined by the skilled person in view of the relative amounts of vapours selected to be condensed, power of the thermoelectric module, flow rates, and physical and thermal characteristics of the condenser means.

By the term "continuous process" in this specification is meant a process as defined that does not need, of necessity, to be intermittently stopped or slowed, or requiring auxiliary cooling of the thermoelectric module in order to prevent overheating of the module, or require release of a portion of the second portion of vapour to similarly expel excess latent heat from the system.

The term "minor portion" means less than half of the vapour or steam generated by the hot element of the module, and which is a function of the design of the apparatus and operating conditions as to prevent overheating of the module by excessive heat transfer to the cooler element.

Generally less than about 40% of the steam is directed to the cooler element.

In a particularly valuable aspect, the liquid is water, and by the term "impure water" is herein meant water containing impurities such as, for example, dissolved salts, volatile organic compounds, and other matter, and/or suspended particulate matter which impure water may be evaporated and concentrated without unwanted carry-over of such impurities.

The term "impure liquid" also includes a liquid, particularly water, that may have been partially purified by heat provided during the process of the invention prior to contact with the heated surface of the module.

The term "vapour" includes "steam".

Preferably, the invention provides a process for treating an impure liquid to produce purified liquid, said process comprising (i) electrically activating a thermoelectric module to provide a heated surface in a first chamber and a cooler surface in a second chamber;

(ii) feeding said impure liquid to said heated surface to produce liquid vapour;

(iii) directing said liquid vapour from said first chamber to said second chamber;

(iv) contacting a minor portion of said liquid vapour with said cooler surface to effect heat transfer to said cooler surface;

(v) cooling a major portion of said vapour in said second chamber with condensation means comprising a second cooler surface to effect heat transfer from said vapour to said second cooler surface and condensation of said vapour to provide said purified liquid; and (vi) collecting said purified liquid.

The process in a preferred form further comprises measuring, adjusting and controlling the process parameters comprising temperature, power supply, and input feed liquid valves.

The process parameter valves are preferably computed in an algorithm to effect the adjustment. By continuously monitoring the process parameter values as hereinabove defined, the computing process enables the process to be self-monitoring and controlling as to be automatically continuous.

Optimum energy efficiently can be obtained when all of the vapour to be condensed is contained in a so-called herein vapour-proof unit.

The unit comprises those parts of the apparatus within which the vapour is formed, transferred and condensed, with no means of release to ambient surroundings.

In a further aspect, the invention provides an improved liquid purifier for purifying a liquid under continuous vapour flow operating conditions comprising thermoelectric module means having a first module heatable surface and a first module coolable surface; means for effecting contact of said impure liquid with said module heatable surface to produce vapour of said liquid; transfer means for transferring said vapour to said first module coolable surface to effect heat transfer to said module coolable surface and condense said vapour to said purified liquid; and means for collecting said purified liquid; said module means being adapted to receive an electric current to activate said module to heat said heatable surface and cool said coolable surface; the improvement comprising (i) first transfer means for directing a first portion of said vapour adjacent to or onto said first module coolable surface to operably effect heat transfer to said first module coolable surface to produce a first condensed liquid;

(ii) condensation means comprising a second coolable surface remote from said module coolable surface for condensing a second portion of said vapour by heat transfer to said second coolable surface to produce a second condensed liquid;

(iii) second transfer means for operably directing said second portion of said vapour to said condensation means;

(iv) receiver means for collecting said first and second condensed liquids; and wherein said condensation means and said direction means are such as to enable the balance of the latent heat contained in the vapour produced by said first module heated surface which cannot be pumped from said cooler module surface through the module to said first module heated surface to be operably received by said condensation means in order to maintain the process under continuous vapour flow.

In a yet further aspect, the invention provides an improved liquid purifier for purifying a liquid under continuous operating conditions comprising thermoelectric module means having a first heatable surface and a coolable surface; means for contacting said impure liquid with said heatable surface to produce vapour of said vapour; means for transferring said vapour to effect heat transfer to said coolable surface; means for condensing said vapour to said purified liquid; and means for collecting said purified liquid; the improvement comprising (a) means for directing a minor portion of said vapour to said coolable surface to maintain said cooler surface at a temperature near or at the boiling point of said liquid; (b) condenser means comprising a second coolable surface means to effect heat transfer to said second coolable surface and, consequently, condensation of a major portion of said vapour to produce said purified liquid; (c) means for directing said major portion of said vapour to said condenser means; and (d) means for collecting said purified liquid from said condenser means, wherein said thermoelectric module is adapted to receive an electric current to activate said module to heat said heatable surface and cool said coolable surface.

In prior art apparatus, the coolable surface constitutes substantially the sole means for condensing the vapour to purified liquid.

The means for directing vapour to a coolable surface may, include, for example, merely, conduit, passage, guide or the like which allows the respective minor of the vapour to pass to the cold sink. Thus, "direction" or "transfer" means includes, but is not limited to guide means through which vapour is passed or passes to an adjacent coolable surface.

In a preferred aspect the invention provides an apparatus for purifying a liquid comprising (a) a housing having a first chamber and a second chamber;

(b) divider means separating the first and second chambers one from the other; the divider means comprising a thermoelectric module having a module heatable surface received within the first chamber and a module coolable surface received within the second chamber;

(c) means for operably contacting impure liquid with the heatable surface within the first chamber to produce vapour;

(d) first transfer means for directing a first portion of the vapour adjacent to or onto the module coolable surface to effect heat transfer to the module coolable surface to produce a first condensed liquid;

(e) condenser means remote from the module coolable surface comprising a second coolable surface for Condensing a second portion of the vapour by heat transfer to produce a second condensed liquid;

(f) second transfer means for directing the second portion of the vapour to the condenser means;

(g) collection means for collecting the first and second condensed liquids;

(h) thermoelectric module adaptation means wherein the module can operably receive an electric current to heat the module heatable surface and cool the module coolable surface; and wherein said condensation means and said direction means are such as to enable the balance of the latent heat contained in the vapour produced by said first module heated surface which cannot be pumped from said cooler module surface through the module to said first module heated surface to be operably received by said condensation means in order to maintain the process under continuous vapour flow.

In one embodiment, the invention provides a liquid purifier comprising a housing having a first chamber and a second chamber; divider means separating said first and second chamber one from the other; said divider means comprising a thermoelectric module having a heatable surface received within the first chamber and a coolable surface within the second chamber; means for contacting impure liquid with said heatable surface within said first chamber to produce vapour; first transfer means for directing a minor said portion of vapour to said coolable surface to effect heat transfer to said coolable surface to maintain the temperature of said coolable surface at or near the boiling point of said liquid; condenser means having a second coolable surface for condensing a major portion of said vapour within said second chamber by heat transfer to produce said purifier liquid; second transfer means for directing said major portion of said vapour by means to said condenser means; and means for preheating said impure liquid feed by said heat transfer with said condenser means; and wherein said thermoelectric module is adapted to receive an electric current to activate said module to heat said heatable surface and cool said coolable surface.

The term "chamber" as used herein is used to include distinct volumes of space under the influence of the respective heated or cooled surfaces of a module or condenser, which chambers may not have clear definable boundaries.

Most preferably, the apparatus has a plurality of the thermoelectric modules aligned coplanar within a divider between the chambers and/or within one or more walls of the chamber.

Thus, preferably, a plurality of modules are arrayed in coplanar fashion in a planar member to provide, for example, a plurality of heatable surfaces at one, i.e. top face of the module and a plurality of coolable surfaces on its bottom face. The aforesaid top face may constitute an inner face of an evaporation chamber and the aforesaid bottom face constitute the corresponding outer face of the evaporation chamber.

Thus, the essence of the present invention is to achieve a continuous evaporation and condensation equilibrium within the apparatus by removing the majority of the thermal (latent) energy of the vapour remote from the coolable surface of the module. The presence of this remote secondary condenser surface which, preferably, effects heat transfer of at least about 60% from the steam enables satisfactory continuous removal of excess heating power from the module. In one embodiment, a 100% conversion from vapour to liquid within the same chamber containing the module cold side can be achieved.

Maximum efficiency of the heat pump can be achieved by maintaining the temperature of the module coolable surface essentially at the boiling point of the liquid, i.e. 97°–100° C. for water by means of a suitable minor portion acting on the coolable surface to effect suitable, but not excessive heat transfer.

In a most preferred aspect, the heat transferred from the major portion of condensed vapour with the condenser is used to pre-heat the impure liquid feed, preferably from ambient temperature to a temperature of at least 90° C. in the case of water. This preheating of the feed water increases the electrical utilization efficiency to over 167% and provide significant power savings when compared to, say, 95% power utilization efficiencies achieved with prior art conventional water purifiers, hereinbefore described.

Thus, the present invention provides in one aspect a water purification system which provides the advantages of:

(a) providing both water evaporation and cooling within the same unit;

(b) being significantly energy efficient by the use amount of electrical energy and heat transfer to perform evaporation and condensation; which energy utilization does not exist in any of the water purification technologies known at this time;

(c) recovering all of the water inputted into the system as pure water, without having to discharge water with high concentrations of impurities and salt as is the case in reverse osmosis technology;

(d) portability of the system and its ability to be scaled up over a very wide range of dimensions and capacities; and wherein the capacity of the system can be increased in a modular fashion;

(e) having the ability to energize the system from a very wide variety of power sources, such as, for example, operable throughout in the world, including remote areas that are not even connected to an energy generation grid; and (f) having the ability of the system to handle any type of water regardless of its salinity and impurities, while still producing pure water that has the same quality as distilled water, which is free from all organic, non-organic and microbial elements.

I have found that non-insulated surfaces of vapour-receiving chambers, conduits and the like enhance condensation of the vapour to reduce the load on the module colder surface. This advantageous arrangement can be enhanced by passing the feed liquid through or around the "cold" chamber to enhance condensation external of the module cooler surface and also pre-heat the feed water.

The apparatus as hereinbefore defined in a preferred form further comprises process control means to measure, control and adjust the process parameters, such as for example, computer algorithmic microprocessor means; temperature sensor, power supply, measurement, adjustment and control means, and input feed liquid valve means. More preferably, the algorithmic means enables the process to be continuously self-monitoring The apparatus according to the invention preferably comprises parts thereof constituted as so-called herein vapour-proof self-contained units which exclusively contain all the vapour. Optimal thermal energy transfer and electrical energy efficiencies can result in such preferred embodiments.

It is a further aspect of the present invention to provide a plurality of multimodule units in the form of an assembly, which may be so designed to be of modular construction as to be built-up to any desired operating size.

The apparatus according to the invention may be operated over significant periods of time although there may be a build-up of impurities in the evaporation tray of the hot side surface of the module which may require down-time cleaning.

BRIEF DESCRIPTION OF THE DRAWINGS

In order that the invention may be better understood, preferred embodiments will now be described by way of example only, with reference to the accompanying drawings wherein.

DETAILED DESCRIPTION OF A PREFERRED EMBODIEMENT OF THE INVENTION

Generally, a water holding compartment is used to hold water to be purified and located on top of the heat extraction chamber so that some of an heat extracted from the condensing process is used to pre-heat the water to be purified. This may also release some of the volatile organic compounds present in the water. The pre-heating process reduces the amount of additional heat energy required to make the water boil in the evaporation tray.

In preferred embodiments, heat exchanger means is used to cool the top of a condensing chamber, whereby the rate of heat extraction from the top of the condensing chamber determines the rate of condensing of the steam produced inside the condensing chamber. Cooling is performed, for example, by using natural convection, forced air convection with fans blowing ambient temperature air through the fins, or liquid cooling by feeding impure feed fluid circulated through a remote secondary heat exchanger.

Figure 1:
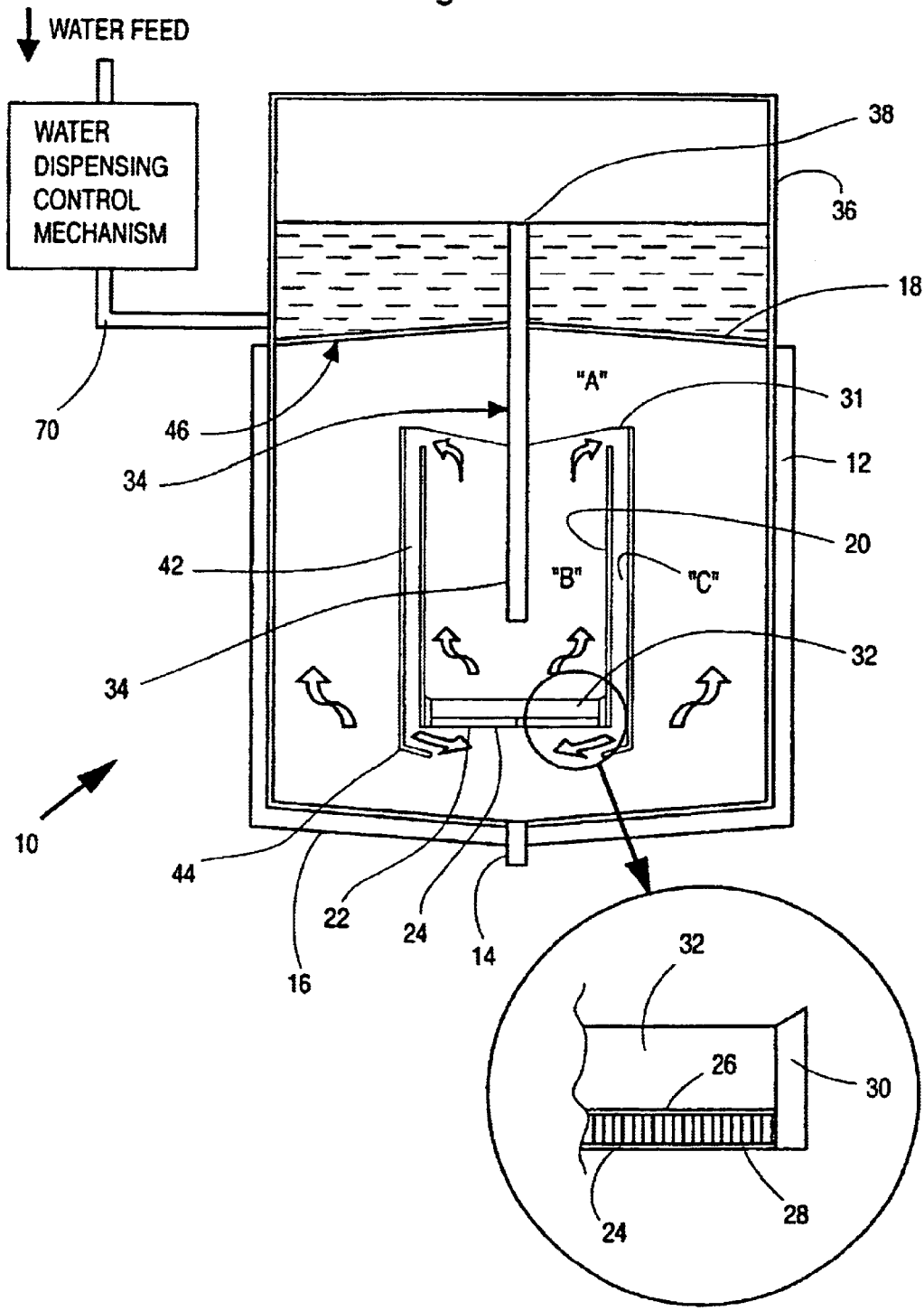
FIG. 1 is a diagrammatic vertical sectional view of a water purifier according to the invention having evaporation and condensing chambers with natural convection water preheating, and showing, in part, an enlarged thermoelectric module as an insert.

With reference to FIG. 1, this shows generally as 10, a closed cylindrical tank 12, formed of a plastics material and having a purified water outlet 14 at tank bottom 16 and a thin thermally conductive stainless steel top 18. Centrally suspended by means not shown within tank 12 is a cylindrical open-topped metal tank 20. The base 22 of tank 20 is constituted by a plurality of thermoelectric modules 24 (Polar TEC™ model HT4-12-30-Melcor Corporation, Trenton, N.J., U.S.A.) in coplanar array one adjacent another (twelve modules in the embodiment shown) having ceramic upper and lower surfaces 26 and 28, respectively. Upper surface 26 constitutes the hot or heatable surface, while the lower surface 28 constitutes, the cooler or coolable surface. The lower wall portion 30 of a hood 31 and upper surface 26 form a water evaporation tray 32. Hood 31 is suspended by attachment to an impure feed water pipe 34 which passes through tank top 18 into a feed water holding tank 36, which holds water to a level 38 to the top of pipe 34. Water is fed to tank 36 on demand from conduit 40 to preheat the impure liquid feed, preferably from ambient temperature to a temperature of at least 90° C. in the case of water.

Hood 31 surrounds tank 20 at a distance to define a cylindrical cavity or steam guide 42 and terminates at its lower end as an inwardly directed lip 44 or cusp adjacent base 14. Lip 44 is so shaped as to direct a minor portion of generated steam out of guide 42 adjacent or onto module coolable surface 28.

In operation, feed water from tank 36 drops down pipe 34 in controllable fashion into tray 32 onto surface 26 whereby it is converted into steam, which rises and passes through guide 42. A portion of the steam is directed onto surface 28 to effect heat transfer and provide the additional heat to be pumped to hot surface 26, at a rate to maintain the cooler surface between 97° and 100° C. The remaining major portion of the steam rises to condense on the inner surface 46 of top 18 whereby the latent heat of condensation is transferred through top 18 to pre-heat the water in tank 36, to, preferably, a temperature of at least 90° C. Water produced at surface 46 runs down the side of tank 12 and is drawn out of pipe 14.

This preheating of the feed water can increase the electrical utilization efficiency to over 167% to provide significant power savings when compared to, say, 95% power utilization efficiencies achieved with prior art conventional water purifiers hereinbefore described.

Thus, the embodiment shown in FIG. 1 provides for the pre-heating of feed water prior to contact with the hotter surface of the module to not only enhance energy efficiency of the system by use of the latent heat of the condensing vapour and, thus, to pre-heat the feed water to require less energy for subsequent vapourization at the hotter surface of the module, but also to facilitate removal or reduction in concentration by boiling, distillation or the like of any volatile organic compounds present in the feed water.

The power supply (not shown) consists of a high voltage and a low voltage section. Input power is normally derived from a 120/230VAC input line. Alternative embodiments may use power supplied from natural energy sources, such as solar or wind power. The input power is converted by the power supply into a source of direct current at a high voltage average level of approximately 160V. This direct current is applied to the thermoelectric heat pumps in the evaporation tray, as well as any thermoelectric heat pumps, associated with the impure water feed as pre-heaters, heaters or chillers in the purified water storage compartment.

Input power is also converted by the power supply into a source of direct current as low voltage levels of approximately 12 and 5 volts. This low voltage power source may be used by any process supervisor unit, electronic flow control valves, feedback sensors for temperature, water level, and pressure, and by any user interface.

In the Figures, the column of space of chambers "A" and "B" and vapour conduit "C", when combined, represent the volume of vapour occupied in the so-called vapour-proof unit within the apparatus as defined, which vapour has no means of release to outside of the unit. This combined vapour space is defined by those walls of the apparatus as shown in the Figures.

Figure 2:
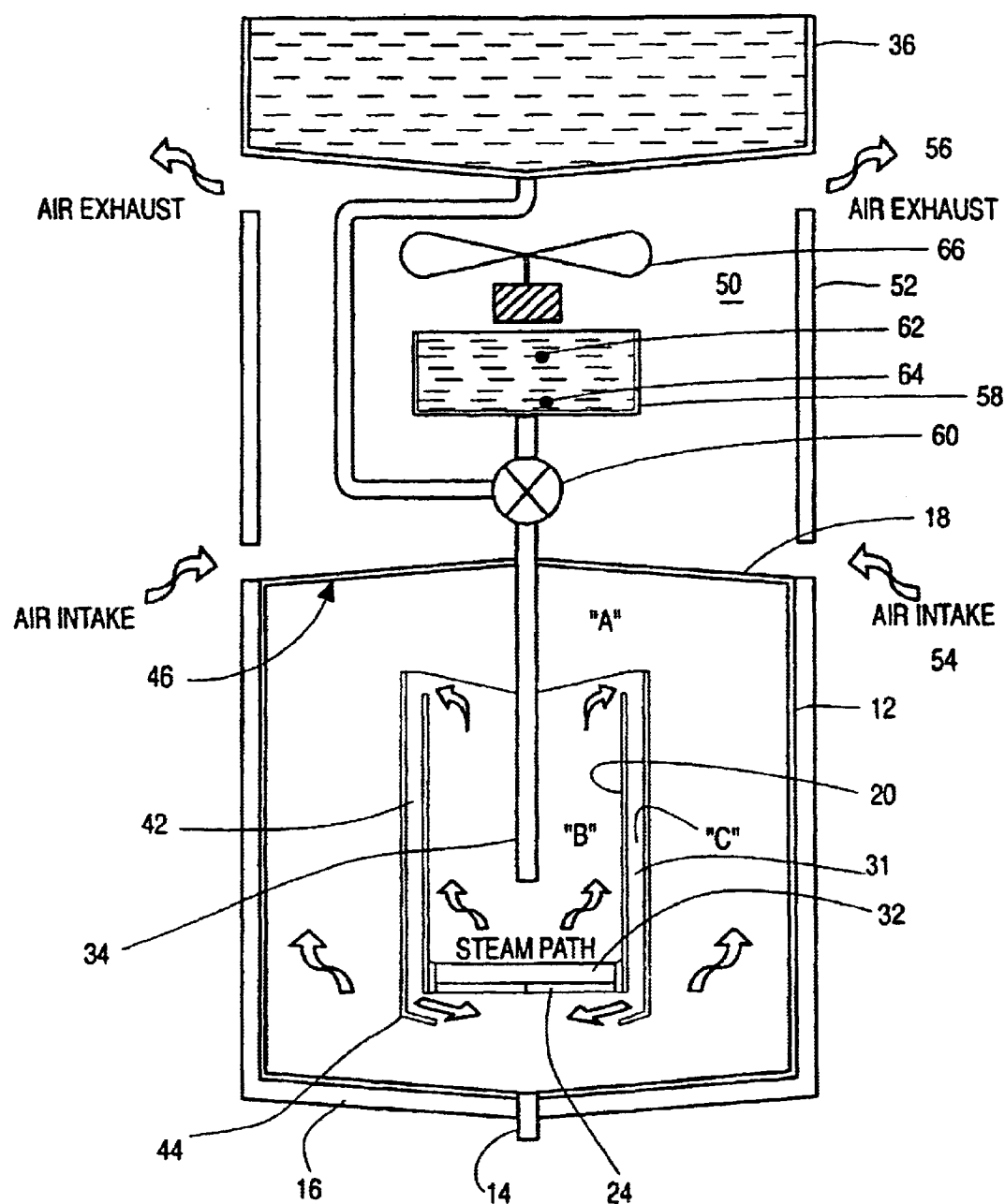
FIG. 2 is a diagrammatic vertical sectional view of a water purifier according to the invention having evaporation and condensing chambers with natural and forced air convection water pre-heating.

With reference to FIG. 2, this shows a modified version of the apparatus shown in FIG. 1 wherein top 18 is cooled by and, thus, preheats an air flow pulled into an air chamber 50 of an upper cylindrical tank 52 having lower intake and upper exhaust apertures 54, 56, respectively.

Downpipe 34 communicates with water holding tank 36 and, within chamber 50, a water pre-fill tray 58 via a three way valve 60. Tray 58 has upper and lower water level detectors 62 and 64, respectively, and is intermittently replenished from tank 36. An air circulation fan 66 provides intake and exhaust air flow directions. Hot air generated by heat exchange surface 46 at top 18 pre-heats the water held in both tanks 58 and 36. The remaining construction and process operation is as described for the apparatus of FIG. 1.

Figure 3:
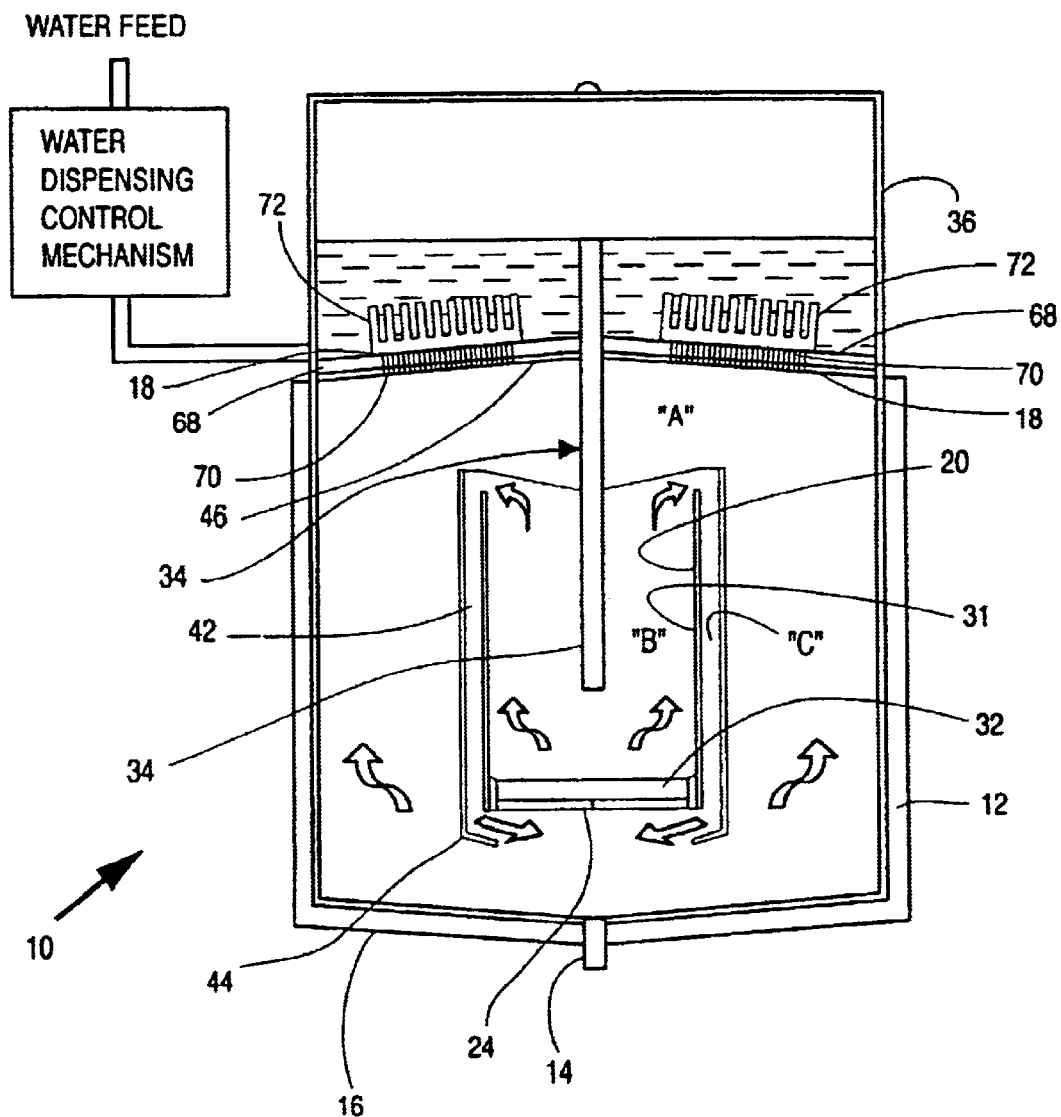
FIG. 3 is a diagrammatic vertical sectional view of a water purifier according to the invention having evaporation and condensing chambers with natural convection water pre-heating and condensing surface heat transfer boost via thermoelectric elements.

FIG. 3 shows a modified version of FIG. 1, wherein top 18 has a plurality of thermoelectric modules 68 embedded therein or, optionally, adjacent thereto, with the coolable element 70 receiving the latent heat of condensation which is pumped to hot side 72 of modules 68. Thus, this heat exchanger means provides pre-heating of feed impure water prior to transfer to tray 32 down pipe 34. Electrical power supply leads to modules 68 are omitted for clarity.

Figure 4:
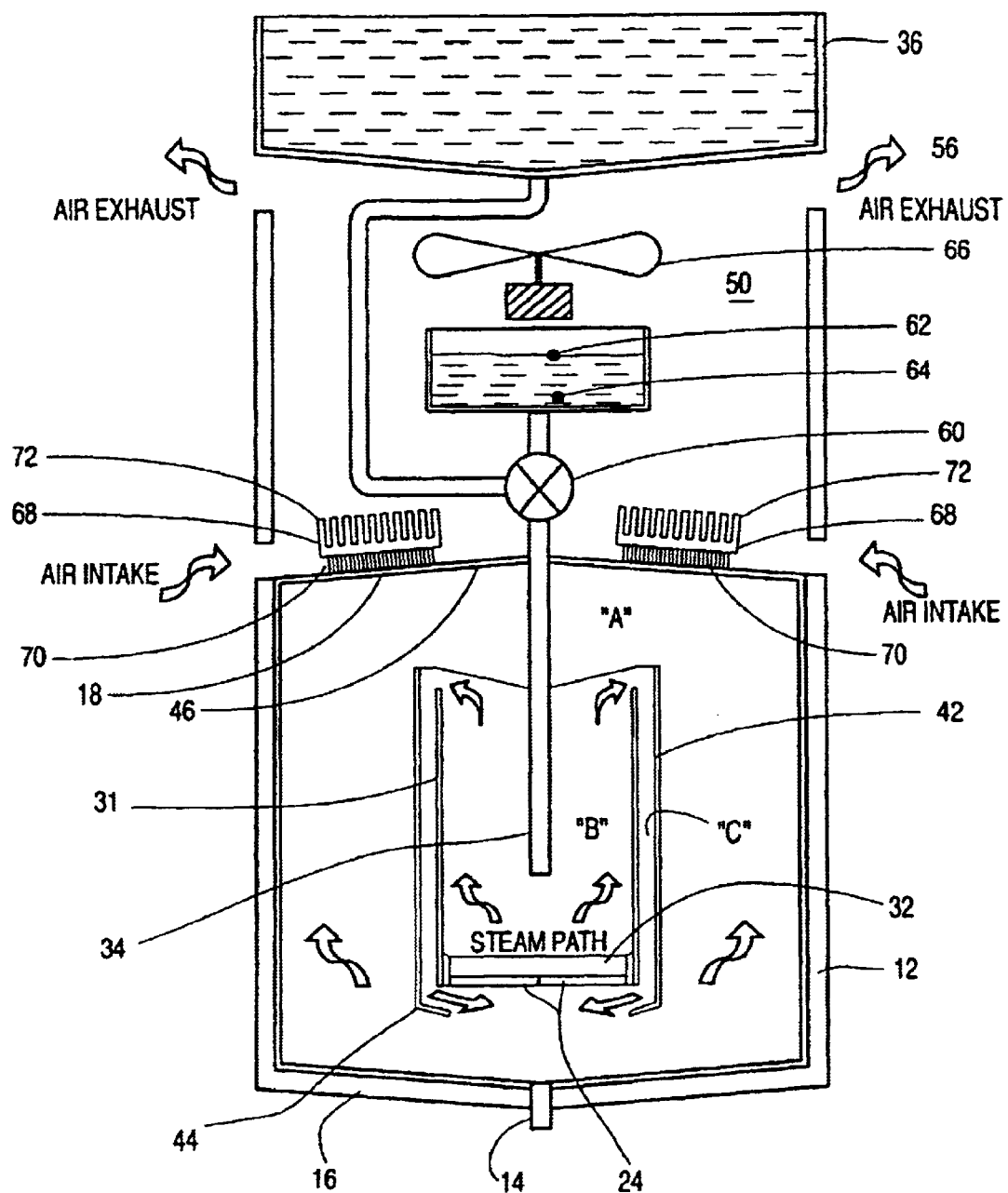
FIG. 4 is a diagrammatic vertical sectional view of a water purifier according to the invention having evaporation and condensing chambers with convention and forced air convection water pre-heating and condensing surface heat transfer boost via thermoelectric elements.

FIG. 4 shows a modified version of the combined apparatus of FIGS. 2 and 3, wherein forced air is pre-heated by the hot sides 72 of modules 68.

Figure 5:
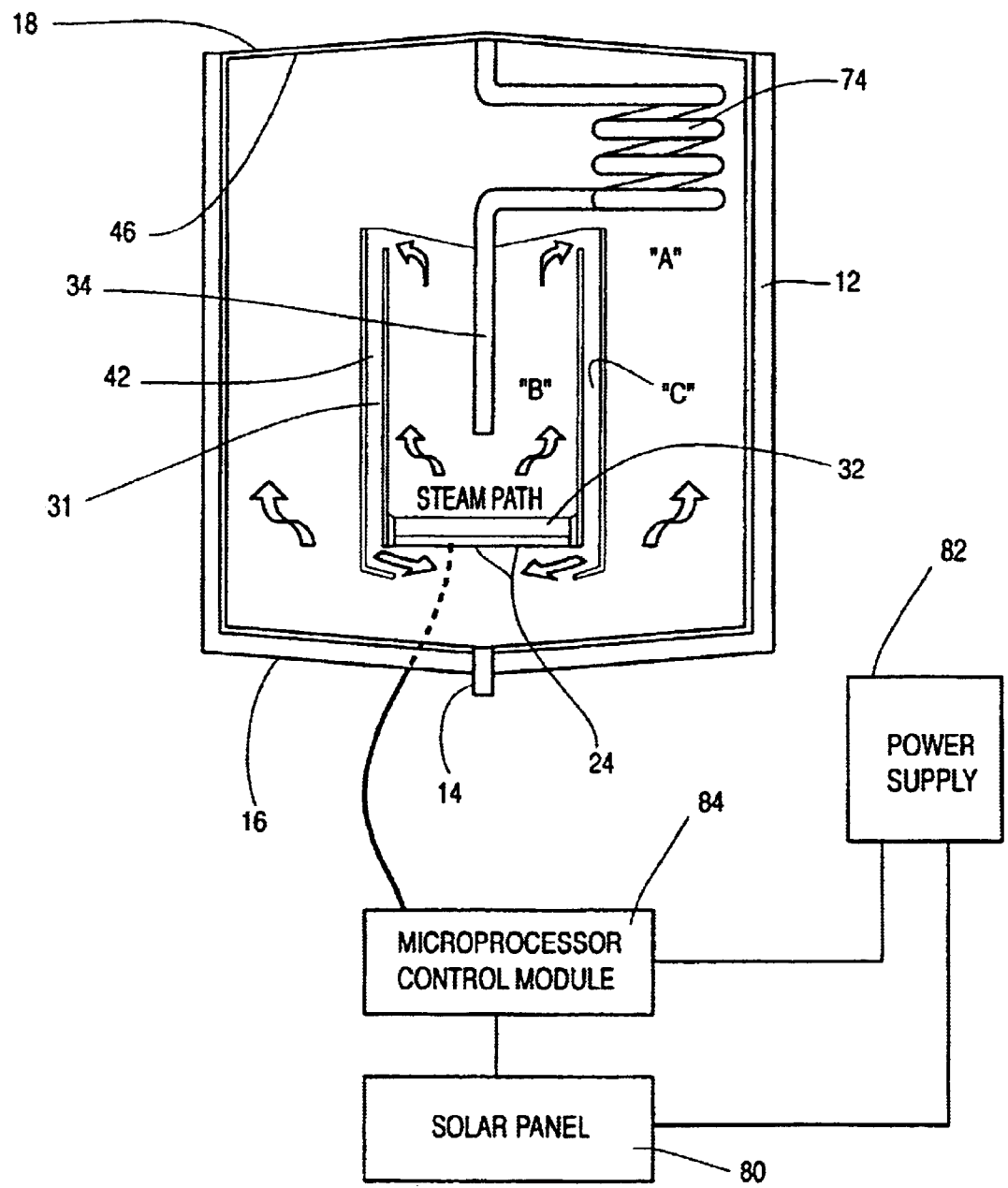
FIG. 5 is a diagrammatic vertical sectional view of a water purifier according to the invention having evaporation and condensing chambers with heat exchanger coil water pre-heating; wherein the arrows indicate steam current flows or where indicated air flows.

FIG. 5 shows a modified version of FIG. 1, wherein pipe 34 comprises a glass or steel heat exchanger coil 74 deposed within tank 12, whereby impure water feed is pre-heated.

DC power is supplied to the thermoelectric module array in bottom 24 from, optionally, a solar panel 80 and/or 12 volt DC power supply 82 through microprocessor control module 84.

Figure 6:
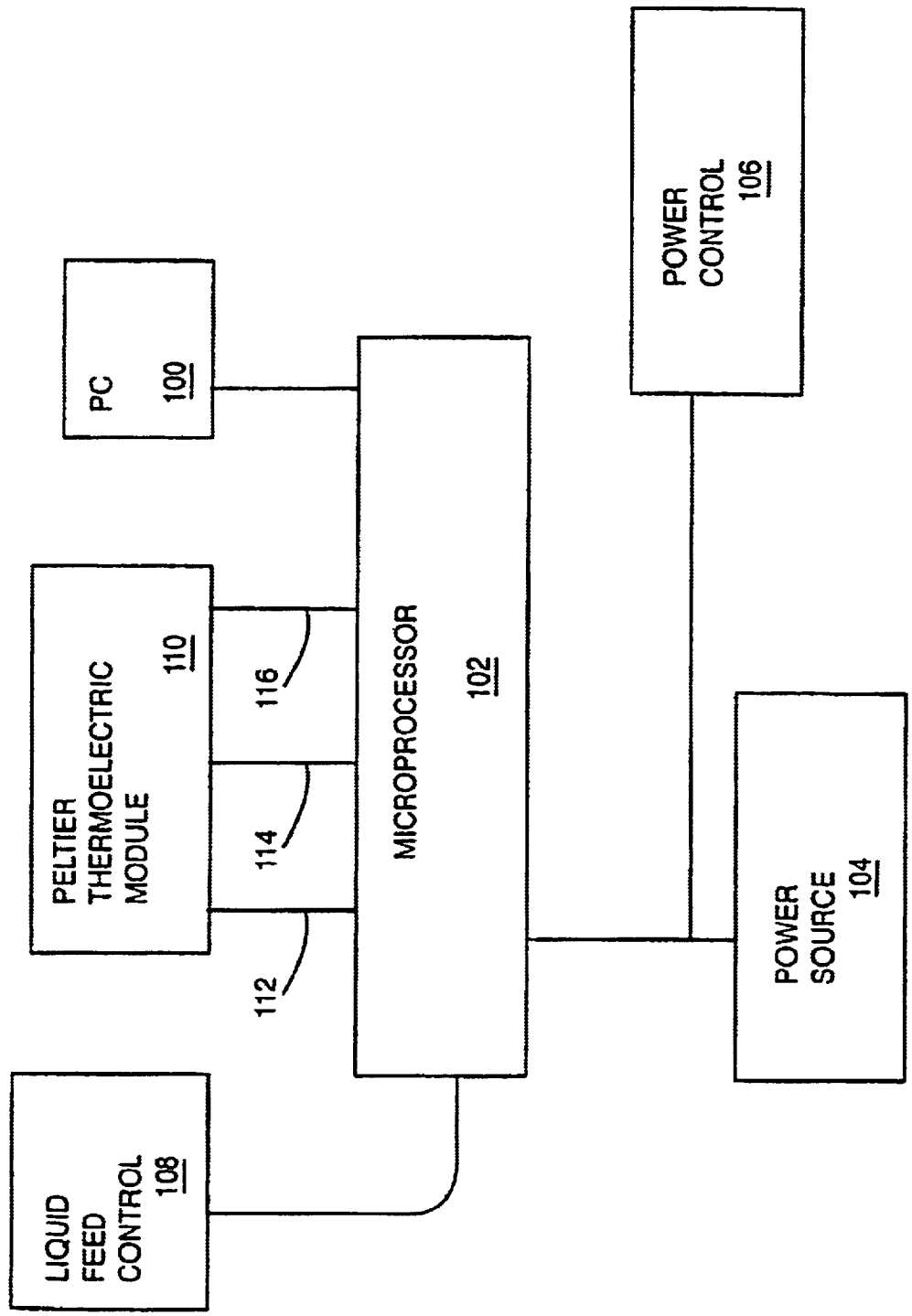
FIG. 6 is a block diagram slowing the computer control links in an embodiment of a liquid purifier according to the invention; and wherein the same numerals denote like parts.

With reference to FIG. 6, this shows a PC 100 loaded with software algorithms set, according to the parameters of the liquid to be treated, to monitor, adjust and control the variable parameter values of a continuously operating vapour-sealed unit of the invention. Suitably located temperature thermistor or thermocouple sensors, liquid control valves, flow rates, volt and power measurement sensors are monitored and controlled by PC 100 through microprocessor 102. Microprocessor 102 is linked to low voltage (5V and 12V) DC logic power source 104, power control 106, input liquid feed monitor and control 108, and Peltier Thermoelectric Element module 110.

In the embodiment shown, temperature sensor links 112, 114 and 116 measure the temperatures of the hot evaporation surface, central portion and cooler condensing surface, respectively, of TEE module 110.

Comparative Tests

A high temperature, high throughput thermoelectric module (Part # HT4012-39) is commercially available from MELCOR THERMOELECTRICS. Operation of this particular module at 3.5 amperes and 15.71 volts, provides a hot side temperature of 103° C. The hot side temperature was chosen to be 103° C. in order to show the typical performance of this module when used to evaporate, at one atmosphere, a layer of water that is in contact with the hot side of the module.

It is known that the heat pumped by the module cold side varies linearly with the cold side temperature. For an electrical input of 55 W (15.71V, 3.5 A), the module pumps 37 Watts at a "cold" plate temperature of 97° C., 29 Watts at a cold plate temperature of 80° C., and 10 Watts at a cold plate temperature of 34° C. Hence, for the same electrical input power, the heat pumping efficiency is 67% (37/55), 53%, and 18% when the cold side temperature is 97°, 80° and 34° C., respectively. This shows that to utilize the maximum heat pumping capability of such a module, the cold plate temperature must be elevated to be close to that of the hot plate temperature. For example, if a layer of water is in contact with the hot side of the module, and the cold side of the module is maintained at a temperature of 97° C., then a total heating power of 55 W electrical input plus 37 Watts of pumping equals 92 Watts is applied through the hot side of the module to the water. As the water boils, an equilibrium is established where the latent heat in the steam rising from the surface of the water equals the heat energy being applied through the hot side of the module to the water. The surface temperature of the water equals the temperature of the steam produced, which equals 100° C. for operation at a pressure of one atmosphere. Hence, 92 Watts applied to the water through the hot side of the module produces steam at 100° C. that has 92 Watts of latent heat. The surface temperature of the hot side of the module rises to higher than 100° C. since additional heat is required to overcome the pressure produced by the weight of the layer of water on the hot side of the module. Experiments conducted with these modules show that in practice, the hot side temperature rises 3° C. for every 1 cm of water thickness on the module hot side tray.

In conclusion, the net effect of the module, when used to heat water, is to produce an added heating power. Hence, for an electrical input of 55 Watts, a heating power of 92 Watts is produced if the cold side is at 97° C., 84 Watts if the cold side is at 80° C., and 65 Watts if the cold side is at 34° C. In this embodiment, the best utilization of the modules is when the cold side temperature is at 97° C. to effectively produce 1.67 Watts of water heating power for every 1 Watt of electrical input power applied.

Prior Art OLS DE3539086A1 uses the cold side of the modules to condense the evaporated steam that is produced by the heat transferred from the hot side of the modules into the liquid that is evaporated. If the aforesaid thermoelectric module (Part # HT4-12-30) is used in the apparatus and process described and illustrated in FIGS. 1, 2 and 3 of DE3539086A1, then it can be reasonably assumed for comparison purposes that the hot side temperature of the module will eventually reach 103° C., if (a) the solvent solution to be purified is water, (b) the pressure is one atmosphere, (c) the voltage applied to the module is 15.71V, (d) the current consumed by the module is 3.5 A, (e) the hot side of the module is in direct contact with the solution to be purified, and (f) the solution to be purified forms a 1 cm thick layer over the tope of the hot side of the module. As electricity is first applied to the module used in this embodiment, the temperatures of the hot side and cold side of the module are equal and assumed to be at ambient air temperature. The hot side receives 55 Watts of heating power, plus whatever heating power is pumped by the cold side to the hot side of the module. As there is no temperature difference between the hot and cold sides of the module during startup, the heating power pumped from the cold side to the hot side is at least 37 Watts. Hence, at least 92 Watts of heating power are initially applied by the hot side of the module to the water to be purified. The water temperature increases to 100° C. as the heating power transferred to the water from the hot side of the module increases the heat energy of the water. As the temperature of the water increases to 100° C., so does the temperature of the hot side of the module which is in direct thermal contact with the water. In order to maintain the maximum level of heat pumping at a zero temperature differential between the hot and cold sides of the module, the rise in the cold side temperature must directly match the rise in the hot side temperature of the module. As soon as the cold side temperature rises above ambient temperature, no heat pumping occurs as heat can not transfer naturally from the colder ambient air to the 'cold' plate. Instead, the cold side temperature will decrease below the ambient air temperature in order to maintain the Peltier heat pumping effect. Hence, the temperature differential between the hot and cold sides begins to increase, and at the same time the amount of heat pumping begins to decrease. This process continues until a large enough temperature differential between the hot and cold sides is produced so that the natural transfer of heat between the air at ambient temperature and the colder temperature colder side equals that rate of heat pumping from the cold side to the hot side of the module.

The temperature of the water to be purified and the hot side of the module will eventually reach 100° C. In fact, the hot side temperature will reach 103° C. The heating power applied by the hot side can no longer be absorbed by the water as liquid heat energy. The water begins to convert into steam at an equilibrium rate so that the latent heat in the steam rising from the surface of the water equals the heat energy being applied through the hot side of the module to the water. Thus, the latent heating power stored in the steam rising from the surface of the water is equal to 55 Watts, plus whatever heating power is being pumped by the Peltier effect from the cold side to the hot side of the module. This pumped heating power, as previously stated can vary from 10 Watts if the cold side temperature is at 34° C., to 37 Watts if the cold side temperature is at 97° C. At startup, the ambient air temperature inside the apparatus described in DE3539086A1 could reasonably be assumed to be 23° C. Hence, minimal added heat pumping occurs during the start of the evaporation of the water to be purified As more steam is generated, the ambient air temperature increases, and the natural rate of heat transfer from the ambient air to the cold side of the module increases. The cold side warms up until the increased heat pumping produced by the decreased temperature differential between the hot and cold sides again matches the natural rate of heat transfer from the ambient air to the cold side. Hence, a higher heat rate and heat pumping efficiency is produced. Eventually, the temperature inside the vessel described in DE3539086A1 will rise towards the 100° C. temperature of the steam being produced. Steam coming in contact with the cold side releases its latent heat and condenses on the surface of the cold side Equilibrium can only be established if the rate of condensation of the steam is equal to the rate of production of the steam. In order for all of the steam that is produced by the heating power transferred from the hot side to condense on the cold side, the cold side must absorb 55 W, plus whatever heat pumping occurs at the cold side. Since the cold side of the module can only absorb the heat that is pumped, 55 W of power that is stored in the latent heat of the steam must be removed from the vessel. Accordingly, a continuous evaporation and condensing equilibrium cannot be established with the apparatus and process described in DE3539086A1.

The only way to practically implement the process described in DE3539086A1 is to follow the teaching of the present invention and to add an external heat exchanger means to remove the excess 55 W of heating power stored as latent heat from the steam produced from the water to be purified. At a near optimal module cold side operating temperature of 97° C. and an ambient temperature of 23° C., the process described in DE3539086A1 could only condense 40% {37/(55+37)} of the steam it produces. As excess steam is produced, the pressure inside the vessel will increase until a pressure relief valve, if present, is activated. Excess steam will then be released into the environment at a rate that equals 1.5 times the rate that steam is being condensed. Hence, 60% of the purified water is lost to the environment as steam, which translates into 60% of the heating energy applied through the hot side of the module. Evaporation occurs readily as the water to be purified is quickly converted into steam. However, the low rate of condensing causes a rapid pressure buildup inside the evaporation chamber, which results in both excess pressure and steam release into the environment. Cascading of modules to increase the temperature differential between the hot and cold sides only decreases the heat pumping capability of the modules, and further reduce the condensing rate of the steam.

If the goal is to purify water using the embodiment described in DE3539086A1, then 55 W of applied electrical power yields only 37 W of energy transfer, for an electrical power utilization efficiency rate of 67%. The conventional purification of water using a heating element, such as that in a kettle, and a cooled condensing coil provides an electrical power utilization efficiency of over 95%. In fact, a similar analysis can be conducted to indicate that the embodiment described in DE3539086A1 is impractical for continuous use due to its inefficiency in any process that attempts to recover a liquid from a solvent solution by first evaporating the liquid and then condensing its vapour. If the goal is, however, to recover a higher boiling point liquid from a solvent solution by first evaporating all of the lower boiling point impurities, then the embodiment described in DE3539086A1 is practical, as it provides, at near optimal operation, a heating power capability of 92 W for an electrical input power of 55 W. Hence, an electrical power utilization efficiency of over 167% can be achieved.

In sharp contrast, the apparatus and process according to the present invention achieves a continuous evaporation and condensing equilibrium inside the vessel by removing the excess latent heat from the steam via "external" heat exchanger means remote from the module cooler surface. For the identical module described hereinbefore, and implemented with all of the previously made assumptions, an excess heating power of 55 W is removed from the vessel without the actual removal of steam. A secondary condensing surface remote from the module is utilized on which the remaining approximately at least 60% of the steam condenses and be collected with the no more than 40% of steam that condenses on the cold side of the module. A 100% conversion of steam to condensate can occur inside the vessel. An electrical power utilization efficiency of over 167% can be achieved as 55 W of electrical input power produces the heating effect of 92 W (55 W+37 W). The 55 W of heat removed from the secondary condensing surface is most preferably reapplied to the feed water entering the vessel. The practical utility of the present invention is that it can achieve full evaporation and condensation equilibrium in the vessel, and thereby increase the throughput of the embodiment described in DE3539086A1 by, say, 250%, (i.e. 100% condensate recovery vs. 40% condensate recovery). Pre-heating of the incoming water to be purified also increases electrical utilization efficiency to over 167% to provide significant power savings when compared with the 95% power utilization efficiency achieved with conventional water purifiers.

EXAMPLE

With reference to the embodiment shown in FIG. 5, operative in a steady state mode, input feed water at a rate of 1 l/hr was heated to form steam by a module having eight Peltier units under approximately 3 amps at 14 volts to use 360–380 watts. This steam condensed on the cooler surface of the module to provide 400 ml water and the remaining 600 ml on the cooling coil and the top surface of the enclosure. This vapour sealed unit thus provided, by reason of thermal recycling, according to the invention, an approximately 50% reduction in electrical energy required to boil the water over conventional distillation processes.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

What is claimed is:

1. An improved continuous process for treating an impure liquid to produce purified liquid, said process comprising electrically activating a first thermoelectric module to provide a first module heated surface and a module cooler surface; feeding said impure liquid to said first module heated surface to produce vapor of said liquid; and transferring said vapor to said module cooler surface to effect heat transfer to said module cooler surface, the improvement comprising (a) directing a first portion of said vapor adjacent to or onto said module cooler surface to effect heat transfer to said module cooler surface to produce a first condensed liquid;

(b) directing a second portion of said vapor to condenser means comprising a second cooler surface remote from said module cooler surface to effect heat transfer to said second cooler surface to produce a second condensed liquid; and (c) collecting said first and second condensed liquids; wherein said condenser means is such as to accept the balance of latent heat contained in the vapor produced by said first module heated surface which latent heat cannot be pumped from said module cooler surface through the first thermoelectric module to said first module heated surface in order to maintain the process under continuous vapor flow.

2. A process as defined in claim 1 wherein said first portion is a minor portion of said vapor, and said second portion is a major portion of said vapor.

3. A process as defined in claim 1 wherein said module cooler surface is a temperature at or near the boiling point of said liquid.

4. A process as defined in claim 1 further comprising pre-heating said impure liquid in whole or in part by heat transfer with latent heat produced from said second portion of said vapor and said condenser means.

5. A process as defined in claim 4 wherein said condenser means comprises a second thermoelectric module having a second module cooler surface and a second module heated surface, directing said second portion to said second module cooler surface to produce said second condensed liquid and wherein said impure liquid is pre-heated in whole or in part by said second module heated surface.

6. A process as defined in claim 4 wherein said impure liquid is heated to distil off in whole or in part any volatile organic compounds present in said impure liquid.

7. A process as defined in claim 1 further comprising measuring, adjusting and controlling process parameters comprising temperature, power supply and input feed liquid rate values.

8. A process as defined in claim 7 comprising computing said process parameter values in an algorithm to adjust said process parameters.

9. A process as defined in claim 8 comprising continuously self monitoring, adjusting and controlling the process by said computing whereby said process is automatically continuous.

10. A process as defined in claim 1 comprising containing all of said vapor is a vapor-proof unit.

11. An improved liquid purifier for purifying an impure liquid under continuous vapor flow operating conditions comprising first thermoelectric module means having a first module heatable surface and a first module coolable surface;

means for effecting contact of said impure liquid with said first module heatable surface to produce vapor of said liquid;

transfer means for transferring said vapor to said first module coolable surface to effect heat transfer to said module coolable surface and condense said vapor to said purified liquid; and means for collecting said purified liquid; said first thermoelectric module means being adapted to receive an electric current to activate said first thermoelectric module means to heat said first module heatable surface and cool said first module coolable surface; the improvement comprising (i) first transfer means for directing a first portion of said vapor adjacent to or onto said first module coolable surface to operably effect heat transfer to said first module coolable surface to produce a first condensed liquid;

(ii) condensation means comprising a second coolable surface remote from said first module coolable surface for condensing a second portion of said vapor by heat transfer to said second coolable surface to produce a second condensed liquid;

(iii) second transfer means for operably directing said second portion of said vapor to said condensation means;

(iv) receiver means for collecting said first and second condensed liquids; and wherein said condensation means and said transfer means are such as to enable the balance of latent heat contained in the vapor produced by said first module heatable surface which cannot be pumped from said first module coolable surface through the first thermoelectric module to said first module heatable surface to be operably received by said condensation means in order to maintain the process under continuous vapor flow.

12. A purifier as claimed in claim 11 wherein said first transfer means comprises vapor guide means.

13. A purifier as claimed in claim 11 further comprising pre-heating means for pre-heating said impure liquid in whole or in part by heat transfer with said condensation means.

14. A purifier as claimed in claim 13 wherein said pre-heating means comprises a second thermoelectric module means having a second module heatable surface and a second module coolable surface, wherein substantially said second portion of said vapor is condensed to produce substantially said second condensed liquid and said impure liquid is operably heated by said second module heatable surface.

15. Apparatus as defined in claim 11 wherein said condenser means comprises a condensed coil.

16. Apparatus as defined in claim 15 wherein said condenser coil constitutes means for pre-heating said impure feed liquid.

17. Apparatus as defined in claim 15 further comprising means for receiving volatile organic compounds evolved from said pre-heated feed liquor.

18. Apparatus as defined in claim 11 further comprising process control means to measure, control and adjust process parameters.

19. Apparatus as defined in claim 18 wherein said process control means comprises
  (i) computer algorithmic microprocessor means;
  (j) temperature sensor, power supply, measurement, adjustment and control means; and
  (k) input feed liquid valve means.

20. Apparatus as defined in claim 19 wherein said algorithmic means enables the process to be continuously self-monitoring.

21. Apparatus as defined in claim 11 comprising a vapor-proof self-contained unit to contain all of said vapor.

22. Apparatus for purifying a liquid comprising
  (a) a housing having a first chamber and a second chamber,
  (b) divider means separating the first and second chambers one from the other; the divider means comprising a first thermoelectric module having a module heatable surface received within the first chamber and a module coolable surface received within the second chamber,
  (c) means for operably contacting impure liquid with the module heatable surface within the first chamber to produce vapor;
  (d) first transfer means for directing a first portion of the vapor adjacent to or onto the module coolable surface to effect heat transfer to the module coolable surface to produce a first condensed liquid;
  (e) condenser means remote from the module coolable surface comprising a second coolable surface for condensing a second portion of the vapor by heat transfer to produce a second condensed liquid;
  (f) second transfer means for directing the second portion of the vapor to the condenser means;
  (g) collection means for collecting the first and second condensed liquids;
  (h) thermoelectric module adaptation means wherein the first thermoelectric module can operably receive an electric current to heat the module heatable surface and cool the module coolable surface; and wherein said condenser means and said transfer means are such as to enable the balance of the latent heat contained in the vapor produced by said module heatable surface which cannot be pumped from said module coolable surface through the first thermoelectric module to said module heated heatable surface to be operably received by said condenser means in order to maintain the process under continuous vapor flow.

23. Apparatus as claimed in claim 22 wherein said second coolable surface is within said second chamber.

24. Apparatus as claimed in claim 23 further comprising an impure liquid feed conduit disposed vertically within said first chamber above said module heatable surface to enable said liquid feed to contact said module heatable surface.

25. Apparatus as defined in claim 22 wherein said second chamber is defined by a vertical wall, a bottom wall and a top wall having an inner chamber surface; and cooling means adjacent said top wall to cool said inner chamber surface to effect condensation of said major portion of said vapor.

26. Apparatus as defined in claim 25 wherein said cooling means comprises means for contacting said top wall with a cooling fluid.

27. Apparatus as defined in claim 26 wherein said fluid is cold air or cold water.

28. Apparatus as defined in claim 25 wherein said top wall comprises a second thermoelectric module having a second module heatable surface and a second module coolable surface, wherein said second module coolable surface is contactable by said second portion of said vapor whereby said second condensed liquid is produced.

29. Apparatus as defined in claim 25 further comprising a second thermoelectric module having a second module heatable surface and a second module coolable surface, wherein said top wall abuts to be cooled by said second module coolable surface to effect condensation of said second portion of said vapor to produce said second condensed liquid.

* * * * *